United States Patent
Ebihara et al.

(10) Patent No.: US 8,818,633 B2
(45) Date of Patent: Aug. 26, 2014

(54) STEERING APPARATUS, AND KICKBACK DETERMINATION APPARATUS

(75) Inventors: Yuji Ebihara, Toyota (JP); Hiroki Kambe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/822,419

(22) PCT Filed: Sep. 15, 2011

(86) PCT No.: PCT/IB2011/002152
§ 371 (c)(1),
(2), (4) Date: Mar. 12, 2013

(87) PCT Pub. No.: WO2012/035418
PCT Pub. Date: Mar. 22, 2012

(65) Prior Publication Data
US 2013/0179037 A1   Jul. 11, 2013

(30) Foreign Application Priority Data

Sep. 17, 2010 (JP) ................................. 2010-210012

(51) Int. Cl.
*B62D 5/04* (2006.01)
*B62D 6/00* (2006.01)

(52) U.S. Cl.
CPC ............ *B62D 5/0472* (2013.01); *B62D 5/0481* (2013.01); *B62D 6/008* (2013.01)
USPC .......................................... 701/41; 701/34.4

(58) Field of Classification Search
USPC .................................................... 701/41–44
See application file for complete search history.

(56) References Cited

U.S. PATENT DOCUMENTS

| 5,719,766 | A  | * | 2/1998 | Bolourchi et al. | ............... 701/42 |
| 6,679,504 | B2 | * | 1/2004 | Delorenzis et al. | ........ 280/5.507 |
| 2002/0157909 | A1 | * | 10/2002 | Hasegawa et al. | ............ 188/290 |
| 2004/0064228 | A1 | * | 4/2004 | Yamamoto et al. | ............. 701/41 |

(Continued)

FOREIGN PATENT DOCUMENTS

| EP | 1 837 267 | 9/2007 |
| EP | 2 189 357 B1 | 1/2011 |

(Continued)

OTHER PUBLICATIONS

Japanese Office Action Issued Jul. 24, 2012 in JP Patent Application No. 2010-210012 Filed Sep. 17, 2010 (English translation only).

(Continued)

*Primary Examiner* — John R Olszewski
*Assistant Examiner* — Nicholas K Wiltey
(74) *Attorney, Agent, or Firm* — Oblon, Spivak, McClelland, Maier & Neustadt, L.L.P.

(57) ABSTRACT

There is provided a steering apparatus that includes a steering member that is provided in a vehicle and that is capable of being turned so as to steer the vehicle; and a determination device configured to determine that a kickback state is present if an operation point determined according to the steering angle of the steering member and the steering torque that acts on the steering member is outside a criterion region that is determined beforehand. The steering apparatus and the kickback determination device are able to properly cope with the kickback.

13 Claims, 10 Drawing Sheets

(56) References Cited

U.S. PATENT DOCUMENTS

| | | | |
|---|---|---|---|
| 2004/0148078 A1* | 7/2004 | Nakano et al. | 701/41 |
| 2005/0087388 A1* | 4/2005 | Turner et al. | 180/446 |
| 2006/0225946 A1* | 10/2006 | Yamazaki et al. | 180/446 |
| 2007/0219691 A1* | 9/2007 | Fukuba et al. | 701/42 |

FOREIGN PATENT DOCUMENTS

| | | |
|---|---|---|
| JP | 2 60886 | 3/1990 |
| JP | 7 228263 | 8/1995 |
| JP | 10 203396 | 8/1998 |
| JP | 2002 308131 | 10/2002 |
| JP | 2004 114910 | 4/2004 |
| JP | 2004 168150 | 6/2004 |
| JP | 2005 172528 | 6/2005 |
| JP | 2006 199219 | 8/2006 |
| JP | 2007 106261 | 4/2007 |
| JP | 2007 283985 | 11/2007 |
| JP | 2008 13094 | 1/2008 |
| JP | 2010 100079 | 5/2010 |
| JP | 2011 245918 | 12/2011 |

OTHER PUBLICATIONS

International Search Report Issued Dec. 28, 2011 in PCT/IB11/02152 Filed Sep. 15, 2011.

* cited by examiner

F I G . 4A
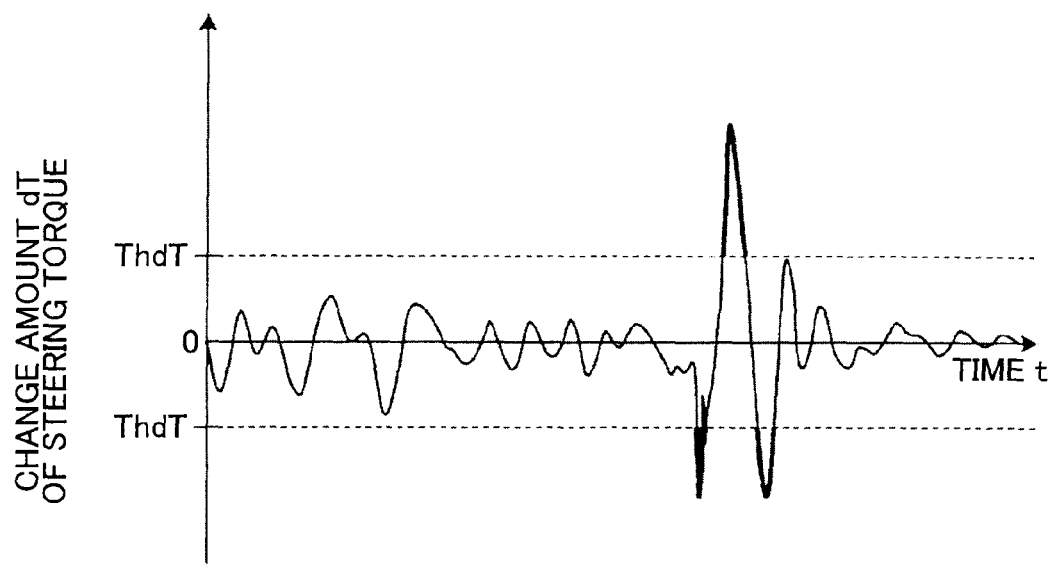
F I G . 4B
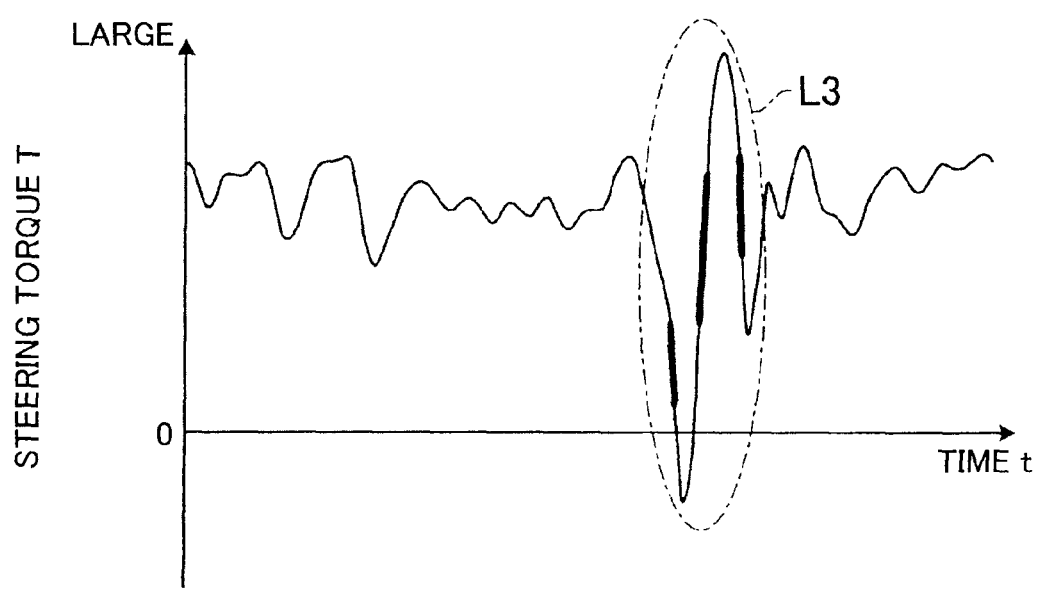

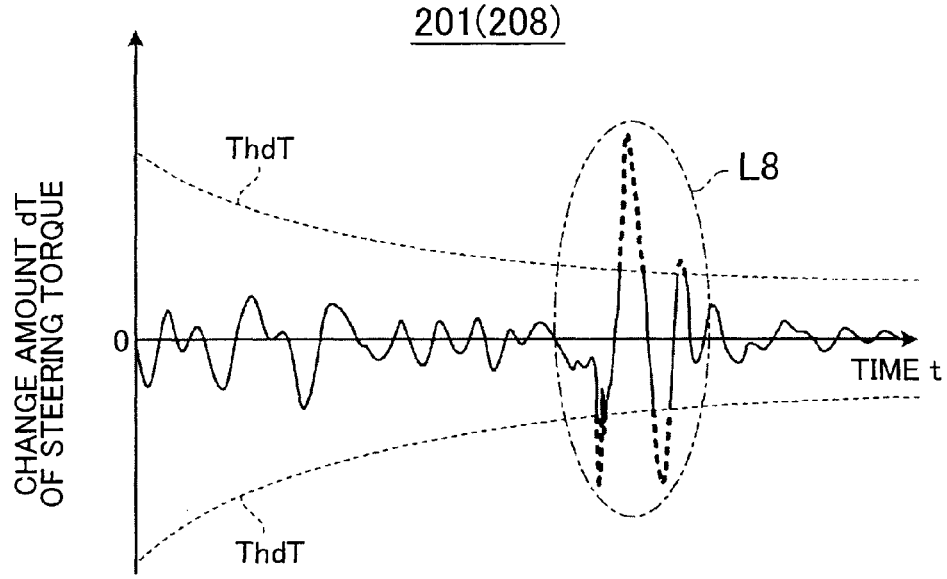
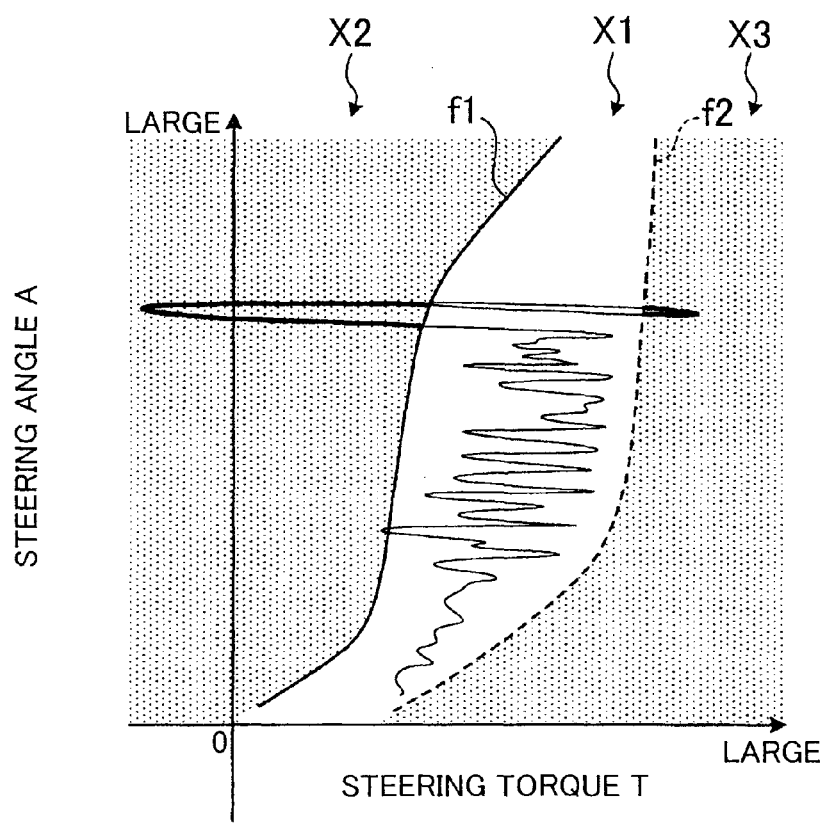

F I G . 12
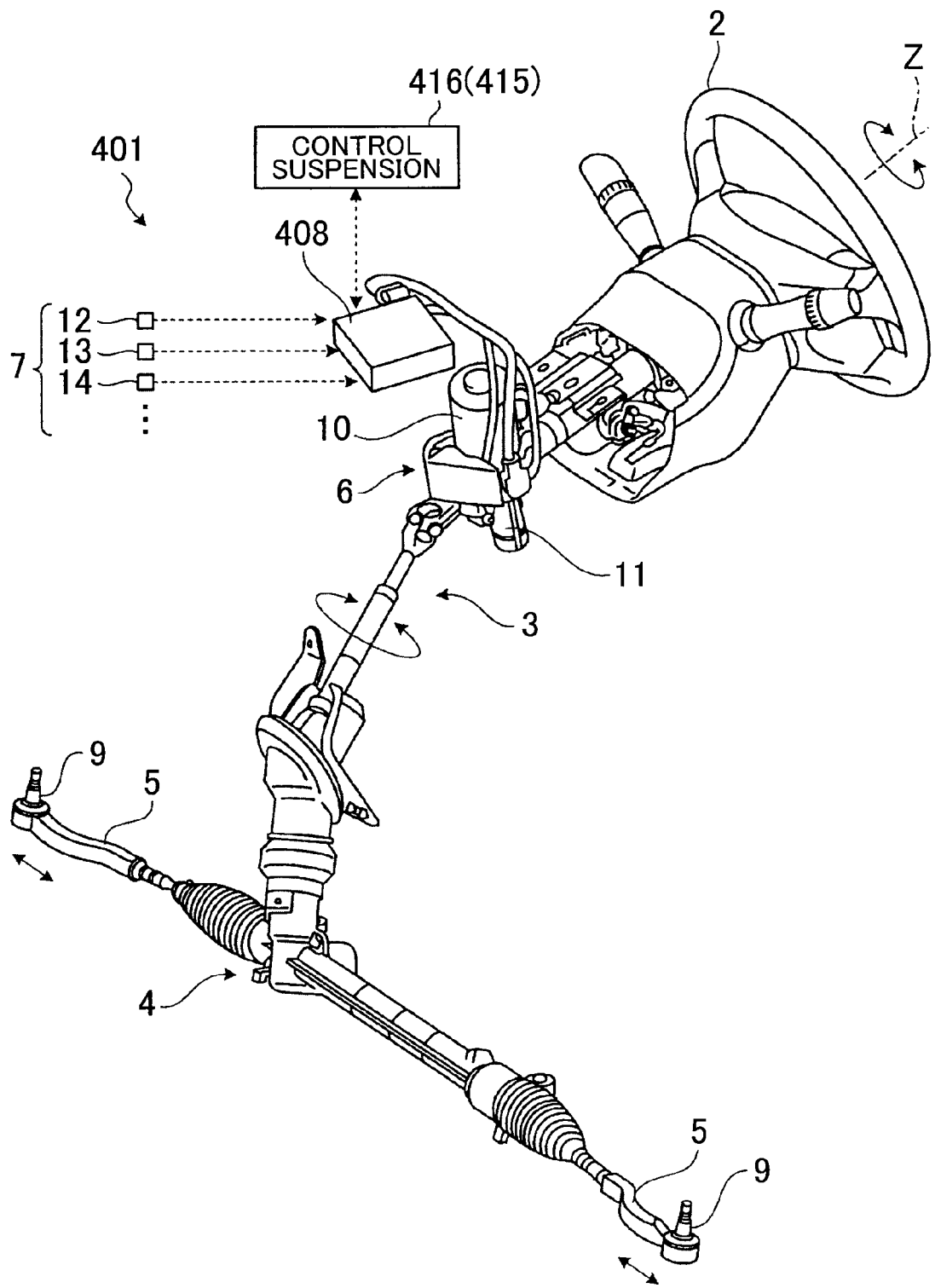

FIG. 13

<CONTROL MAP>

|  | CHANGE AMOUNT THRESHOLD VALUE ThdT | CRITERION REGION X1(f1, f2) |
|---|---|---|
| NORMAL MODE<br>COMFORT MODE<br>SPORTS MODE | NORMAL<br>LOW<br>HIGH | NORMAL<br>REDUCED<br>EXPANDED |

STEERING APPARATUS, AND KICKBACK DETERMINATION APPARATUS

INCORPORATION BY REFERENCE

The disclosure of Japanese Patent Application No. 2010-210012 filed on Sep. 17, 2010, including the specification, drawings and abstract is incorporated herein by reference in its entirety.

BACKGROUND OF THE INVENTION

1. Field of the Invention

The invention relates to a steering apparatus and a kickback determination apparatus.

2. Description of the Related Art

A known steering apparatus or a known kickback determination apparatus disclosed in, for example, Japanese Patent Application Publication No. 7-228263 (JP-A-7-228263), is an electric power steering apparatus that drives an electric motor to perform assist steering according to the steering torque. This electric power steering apparatus determines the presence of a state in which a kickback is occurring, when the steering angular speed is smaller than a predetermined value and the amount of change in steering torque is larger than a predetermined value. Then, the apparatus accordingly corrects and increases the output of the electric motor in such a direction as to cancel out the kickback, thus preventing deterioration of the steering feeling.

By the way, as for the electric power steering apparatus described in Japanese Patent Application Publication No. 7-228263 (JP-A-7-228263), it is demanded to more properly cope with the kickback.

SUMMARY OF THE INVENTION

The invention has been accomplished in view of the above-stated circumstances, and provides a steering apparatus and a kickback determination apparatus that are capable of properly coping with the kickback.

According to one aspect of the invention, there is provided a steering apparatus having a steering member that is provided in a vehicle and that is capable of being turned so as to steer the vehicle, the steering apparatus being characterized by comprising a determination device configured to determine that a kickback state a determination device configured to determine that a kickback state in which a fluctuation of a steering wheel that occurs as fluctuation of the state of contact between a road surface and a steering road wheel propagates to the steering wheel is occurring is present, if an operation point determined based on steering angle of the steering member and steering torque that acts on the steering member is outside a criterion region that is set beforehand.

Besides, in this steering apparatus, a width of the criterion region in terms of the steering torque may differ according to magnitude of the steering angle.

Besides, in the steering apparatus, the determination device may be configured to change the criterion region according to state of the vehicle. Herein, the state of the vehicle may include the state of travel of the vehicle, the state of steering of the vehicle, or the state of operation tendency that the driver demands.

Besides, in the steering apparatus, the determination device may be configured to change the criterion region according to the vehicle speed of the vehicle.

Besides, in the steering apparatus, the determination device may be configured to make the criterion region narrower when the vehicle speed is relatively high than when the vehicle speed is relatively low.

Besides, in the steering apparatus, the determination device may be configured to change the criterion region according to a set mode of an actuator that is mounted in the vehicle.

Besides, in the steering apparatus, the actuator may be capable of changing a suspension characteristic of the vehicle.

Besides, in the steering apparatus, the set mode may include a sports mode in which tendency toward sports driving is high, a comfort mode in which the tendency toward sports driving is low, and a normal mode in which the tendency toward sports driving is ordinary. Then, the determination device may be configured to set the criterion region relatively broad during the sports mode and set the criterion region relatively narrow during the comfort mode.

Besides, in the steering apparatus, a region outside the criterion region may be divided into a plurality of stages according to magnitude of the kickback to the steering member.

Besides, in the steering apparatus, the determination device may be configured to determine that the kickback state is present, if the change speed of the steering angle is smaller than a predetermined speed that is set beforehand and the change amount of the steering torque per unit time is larger than a predetermined change amount per unit time that is set beforehand. At this time, the determination device may set the predetermined change amount per unit time to progressively smaller values for larger values of the steering angle, and may set the predetermined change amount per unit time to progressively larger values for smaller values of the steering angle Besides, the steering apparatus may further include: an adjustment device configured to adjust vibration in a rotation direction of the steering member; and a control device configured to execute a control of restraining the vibration by controlling the adjustment device, if an operation point determined according to steering angle of the steering member and steering torque that acts on the steering member is outside a criterion region.

According to another aspect of the invention, there is provided a steering apparatus having a steering member that is provided in a vehicle and that is capable of being turned so as to steer the vehicle, the steering apparatus being characterized by further comprising: an adjustment device configured to adjust vibration in a rotation direction of the steering member; and a control device configured to execute a control of restraining the vibration by controlling the adjustment device, if an operation point determined according to steering angle of the steering member and steering torque that acts on the steering member is outside a criterion region.

According to still another aspect of the invention, there is provided a kickback determination apparatus characterized in that the kickback determination apparatus determines that a kickback state in which a kickback is occurring is present, if an operation point determined according to steering angle of a steering member that is provided in a vehicle and that is capable of being turned so as to steer the vehicle and steering torque that acts on the steering member is outside a criterion region.

The steering apparatus and the kickback determination apparatus according to the invention as described above achieve an effect of being able to properly cope with the kickback.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 4A and 4B are graphs illustrating an example of an amount-of-torque change determination performed in the steering apparatus in accordance with the first embodiment;

FIG. 8 is a graph illustrating the amount-of-torque change determination commensurate with state of the vehicle which is performed by a steering apparatus in accordance with a second embodiment of the invention;

FIG. 9 is a graph illustrating the operation point determination commensurate with the state of the vehicle during a low-vehicle speed state which is performed by the steering apparatus in accordance with the second embodiment;

FIG. 12 is a schematic perspective view showing a general construction of a steering apparatus in accordance with a fourth embodiment of the invention; and FIG. 13 shows an example of a control map showing change amount threshold values per unit time and criterion regions for various set modes which is for use in the steering apparatus in accordance with the fourth embodiment.

DETAILED DESCRIPTION OF EMBODIMENTS

Hereinafter, embodiments of the invention will be described in detail with reference to the drawings. Incidentally, these embodiments do not limit the invention. Besides, the component elements of the embodiments described below include elements that can be replaced with different elements or can easily be conceived by a person with ordinary skill in the art or that are substantially the same as those used in the related-art technologies.

Figure 1:
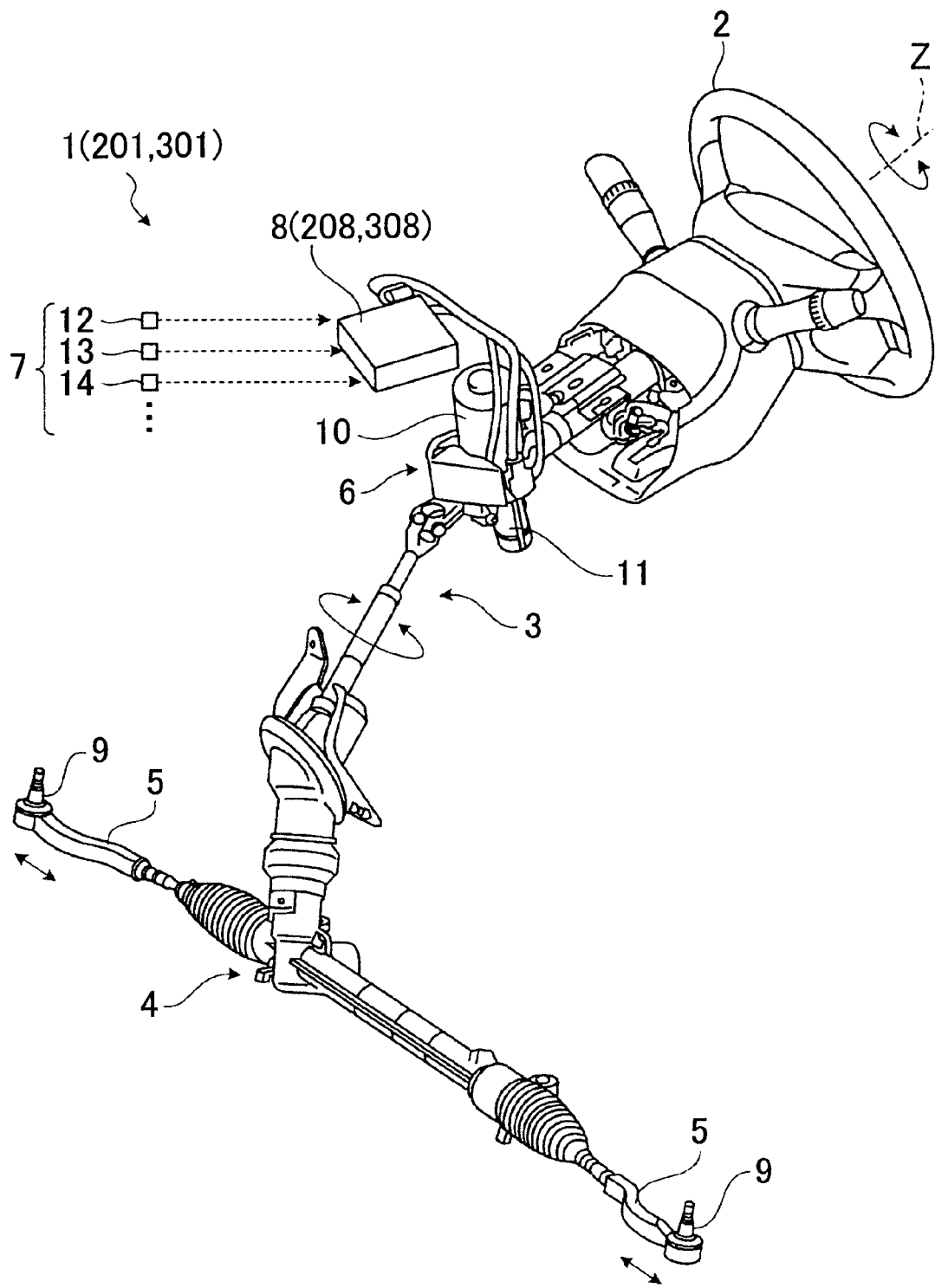
FIG. 1 is a schematic perspective view showing a general construction of a steering apparatus in accordance with first (second, third) embodiment of the invention.
Figure 2:
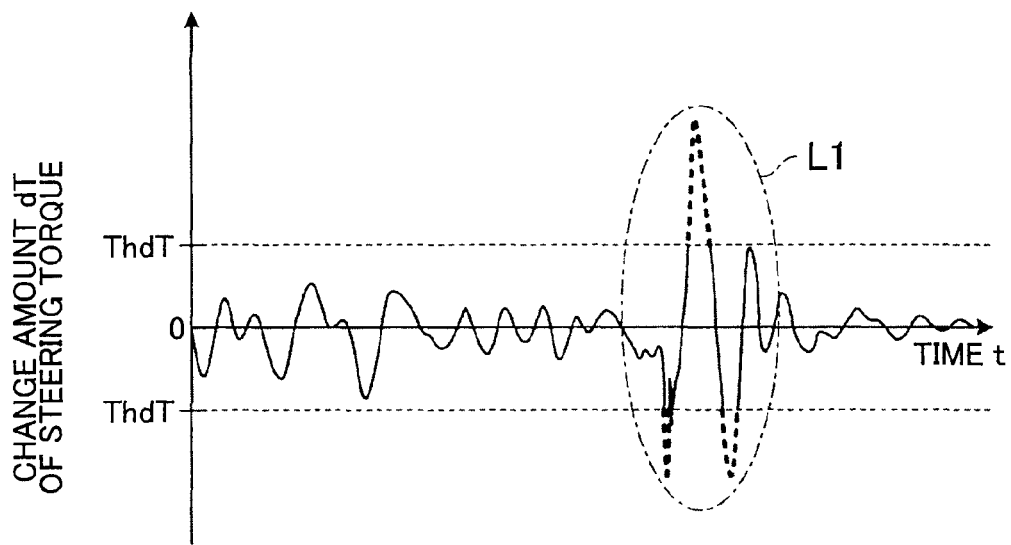
FIG. 2 is a graph illustrating an amount-of-torque change determination performed by the steering apparatus in accordance with the first embodiment.
Figure 3:
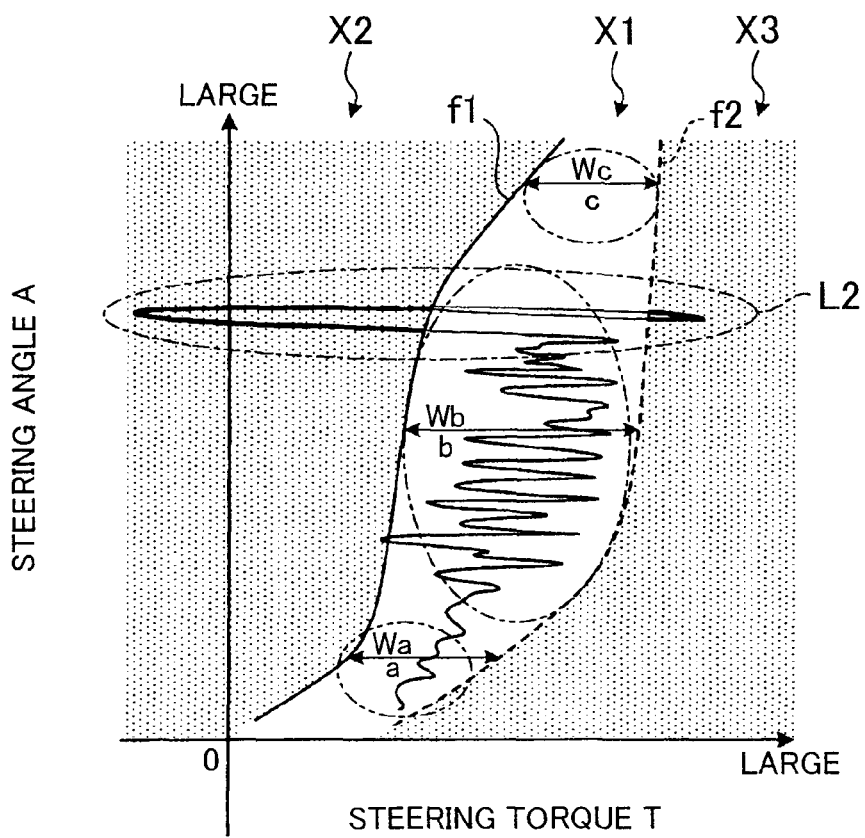
FIG. 3 is a graph illustrating an operation point determination performed in the steering apparatus in accordance with the first embodiment.
Figure 5A:
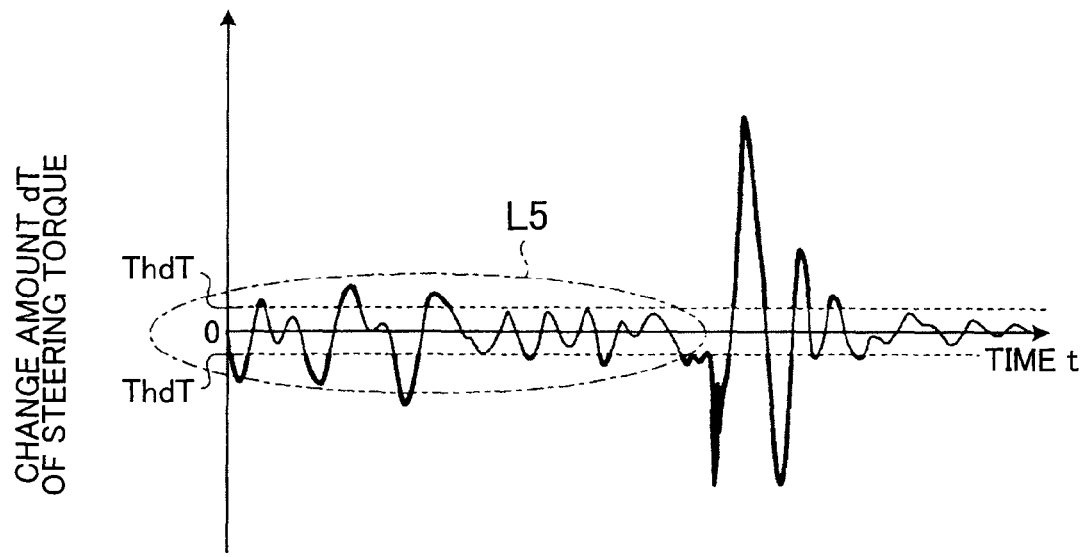
FIGS. 5A and 5B are graphs illustrating another example of the amount-of-torque change determination performed in the steering apparatus in accordance with the first embodiment.
Figure 5B:
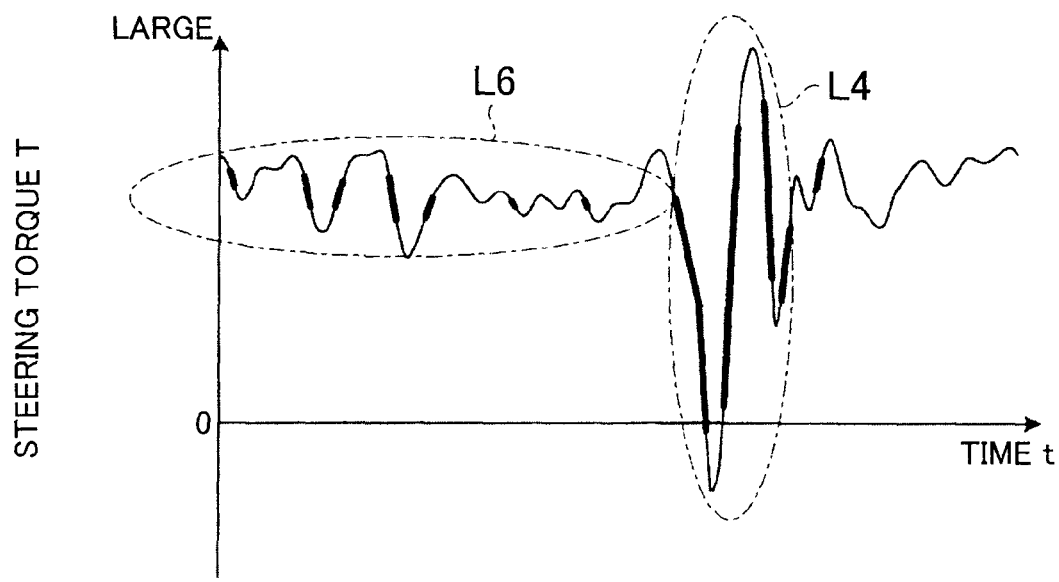
Figure 6:
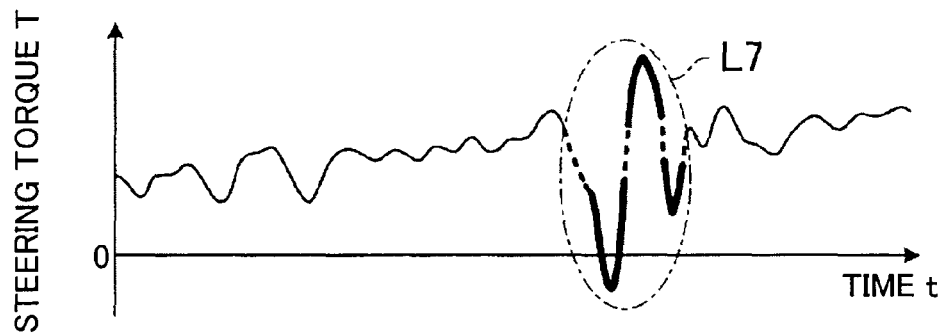
FIG. 6 is a graph illustrating an example of a kickback determination performed in the steering apparatus in accordance with the first embodiment.
Figure 7:
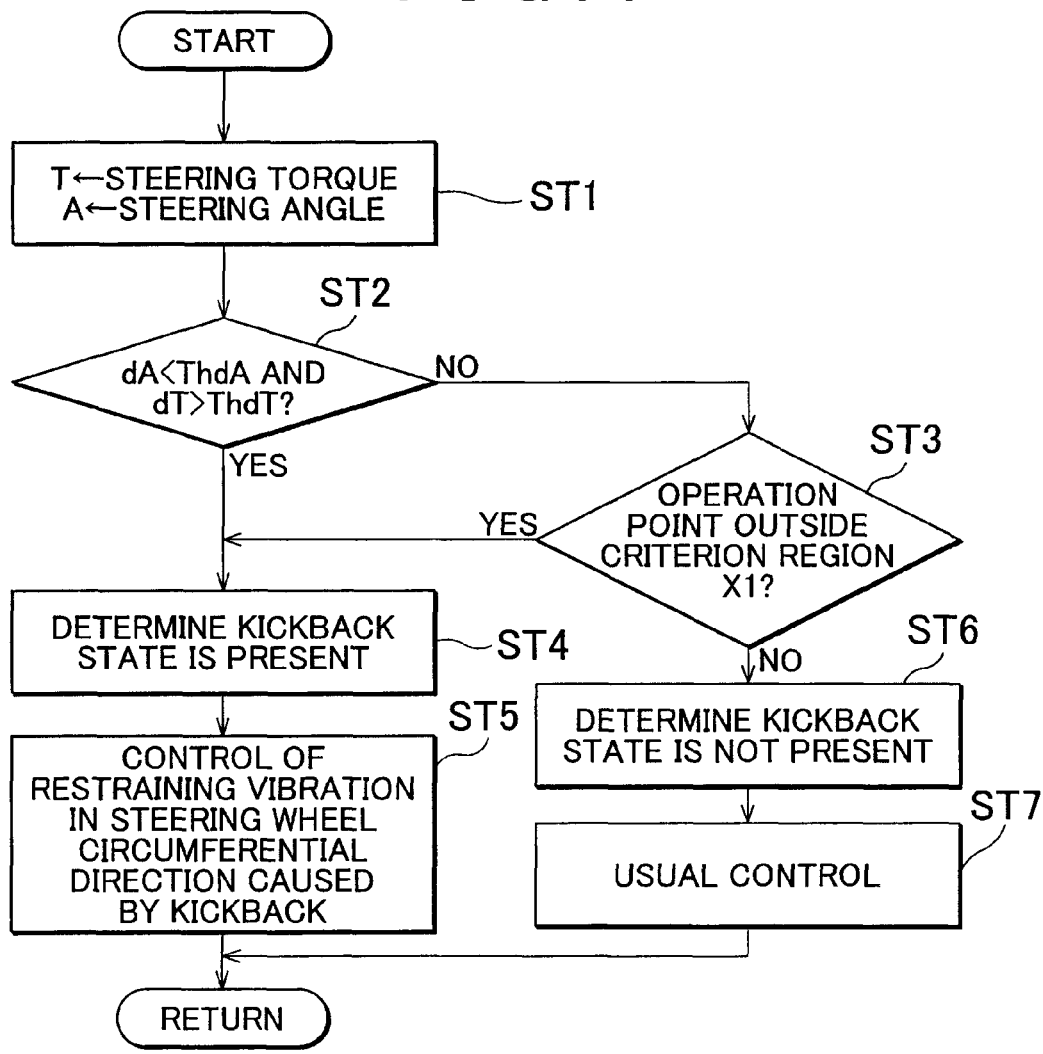
FIG. 7 is a flowchart illustrating an example of a kickback determination control performed in the steering apparatus in accordance with the first embodiment.

Firstly, a first embodiment of the invention will be described. FIG. 1 is a schematic perspective view showing a general construction of a steering apparatus in accordance with the first embodiment of the invention. FIG. 2 is a graph illustrating an amount-of-torque change determination performed in the steering apparatus in accordance with the first embodiment. FIG. 3 is a graph illustrating an operation point determination. FIGS. 4 and 5 are graphs illustrating an example of the amount-of-torque change determination; FIG. 6 is a graph illustrating an example of kickback determination. FIG. 7 is a flowchart illustrating an example of the kickback determination control.

A steering apparatus 1 of the embodiment shown in FIG. 1 is an apparatus that is mounted in a vehicle and that is used to steer the steer road wheels of the vehicle. The steering apparatus 1 of this embodiment is a so-called electric power steering apparatus (EPS) that assists in exertion of steering force for the vehicle by using motive power of an electric motor or the like. The steering apparatus 1 assists a driver in the steering operation by driving the electric motor or the like so as to provide a steering assist force commensurate with the force that is applied to the steering wheel 2 as a steering member by the driver.

Concretely, the steering apparatus 1, as shown in FIG. 1, includes a steering wheel 2, a steering shaft 3, a rank-and-pinion gear mechanism (hereinafter, simply termed the gear mechanism unless otherwise stated) 4, a pair of right and left tie rods 5, an EPS device 6 as an adjustment device, a state detection device 7, and an EPS control device 8 as both a kickback determination apparatus and a control device.

The steering wheel 2 is a member that is rotatable in the directions about a rotation axis Z. A driver of the vehicle is allowed to perform steering operations by rotating the steering wheel 2 with the rotation axis Z being the center of rotation, so as to steer (turn) steering road wheels. The steering shaft 3 forms a rotary shaft portion of the steering wheel 2 and, in this embodiment, is divided into a plurality of members that include an upper shaft, an intermediate shaft, a lower shaft, etc. An end of the steering shaft 3 is linked to the steering wheel 2 and another end thereof is linked to the gear mechanism 4 so that the steering shaft 3 is rotatable about a center axis thereof by the driver performing a rotating operation of the steering wheel 2. The gear mechanism 4 has a so-called rack-and-pinion type gear mechanism, and thus mechanically links the steering shaft 3 and the two tie rods 5 to each other. The gear mechanism 4, due to the effect of the gear mechanism, converts rotating motion of the steering shaft 3 about the center axis into linear motion of the two tie rods 5 in the left-right direction (that typically corresponds to the transverse direction of the vehicle). A proximal end portion of each of the two tie rods 5 is linked to the gear mechanism 4. A tie rod end 9 of each tie rod 5 that forms a distal end portion thereof is linked to a corresponding steering road wheel via a knuckle arm (not shown). That is, the steering wheel 2 is linked to the steering road wheels via the steering shaft 3, the gear mechanism 4, the tie rods 5, etc.

The EPS device 6 outputs an assist steering force (assist torque) that adds to the steering force (steering torque) that the driver inputs to the steering wheel 2. The EPS device 6 supports the steering operation of the driver by moving the steering road wheels of the vehicle by using an electric motor or the like. The EPS device 6 assists in the steering operation of the driver by causing the assist torque to act on the steering shaft 3. The assist torque is a torque that adds to a steering torque that is comparable to the steering force that the driver inputs to the steering wheel 2.

This EPS device 6 is a so-called column EPS device (column assist type assist mechanism), and has an electric motor 10 as a column assist electric motor that generates rotative power (motor torque) because of the supply of electric power, and a speed reducer 11 that transmits the rotative power of the motor 10 to the steering shaft 3 while reducing the rotation speed thereof. In the EPS device 6, as the electric motor 10 rotates, the rotative power generated by the electric motor 10 is transmitted to the steering shaft 3 via the speed reducer 11. In this manner, the EPS device 6 gives a steering assist force (assist torque) to the steering shaft 3, thus carrying out steering assist. The EPS device 6 is electrically connected to the EPS control device 8 (described below), whereby the driving of the electric motor 10 is controlled.

The state detection device 7 detects the state of the vehicle in which the steering apparatus 1 is mounted. The state detection device 7 is electrically connected to the EPS control device 8, and is able to exchange therewith information such as detection signals, drive signals, control commands, etc. The state detection device 7 includes, for example, a steering angle sensor 12 that detects the steering angle that is the rotation angle of the steering wheel 2, a torque sensor 13 that detects the steering torque that is the torque that acts on the steering wheel 2, a vehicle speed sensor 14 that detects the vehicle speed of the vehicle in which the steering apparatus 1 is mounted, etc. The torque sensor 13 detects the torque that acts on, for example, a torsion bar (not shown) that is a twisting member that constitutes a portion of the EPS device 6. The torque that the torque sensor 13 detects is typically a torque that reflects a steering torque that acts on the steering shaft 3 according to the steering force that the driver inputs to the steering wheel 2, and a disturbance torque that is input to the steering shaft 3 from the steering road wheel side via the tie rod ends 9 according to the road surface disturbance input to the steering road wheels or the like, among other types of torque.

The EPS control device 8 controls the driving of the EPS device 6. The EPS control device 8 is an electronic circuit made up mainly of a well-known microcomputer that includes a CPU, a ROM, a RAM and an interface. The EPS control device 8 is electrically connected to, for example, the various sensors of the state detection device 7, and the EPS device 6. The EPS control device 8 accepts input of electric signals that correspond to detection results provided by the various sensors, and outputs a drive signal to the EPS device 6 according to the input detection results so as to accordingly control the driving of the EPS device 6. Incidentally, the EPS control device 8 may also be electrically connected to, for example, an ECU that controls various portions of the vehicle in which the steering apparatus 1 is mounted, and may be constructed so as to exchange with the ECU various kinds of information such as detection signals, drive signals, command signals, etc. Alternatively, the EPS control device 8 may be constructed integrally with such an ECU.

The EPS control device 8, on the basis of the torque detected by the torque sensor 13 and the like, controls the EPS device 6 so as to adjust the assist torque that the EPS device 6 applies to the steering shaft 3. The EPS control device 8 adjusts the output of the electric motor 10 by adjusting the assist current that is a current supplied the electric motor 10 of the EPS device 6, in order to adjust the assist torque.

Basically, on the basis of the torque detected by the torque sensor 13, the EPS control device 8 controls the electric motor 10 so that the EPS device 6 generates assist torque commensurate with the steering torque (assist control). At this time, in the steering apparatus 1, the steering torque that is input from the driver to the steering wheel 2, and the assist torque that the EPS device 6 generates according to the steering torque, the disturbance torque, etc., through the control of the EPS control device 8, act on the steering shaft 3. Then, in the steering apparatus 1, as the steering force and the steering assist force from the steering shaft 3 act on the tie rods 5 via the gear mechanism 4, the tie rods 5 are displaced in the left-right direction by an axial force whose magnitude is commensurate with the steering torque and the assist torque, so that the steering road wheels are turned.

Besides, by adjusting the assist torque generated by the EPS device 6 on the basis of the torque detected by the torque sensor 13, the EPS control device 8 executes a control of restraining the vibration that acts on the steering wheel 2 in the rotation direction, that is, the vibration in the directions about a rotation axis Z (vibration restraining control). For example, if a disturbance, such as an input from the road surface, brake vibration, etc., is input to the tie rods 5 of the steering apparatus 1, there is a possibility of the disturbance appearing as vibration of the steering wheel 2 in the rotation direction via the gear mechanism 4 and the steering shaft 3 and thus being transmitted to the driver. Therefore, the EPS control device 8 restrains the vibration of the steering wheel 2 in the rotation direction by adjusting the output of the electric motor 10 so as to adjust the assist torque generated by the EPS device 6 according to the state of operation of the vehicle. That is, the EPS device 6 functions also as a vibration restraining device that generates assist torque in order to restrain the vibration caused by the input of disturbance from the steering road wheel side. The EPS control device 8 restrains the disturbance vibration by correcting the assist characteristic of the EPS device 6.

In this embodiment, the EPS device 6 functions also as an adjustment device that adjusts the vibration of the steering wheel 2 in the rotation direction, and is able to variably adjust the degree of transmission of the vibration transmitted to the steering wheel 2 in the rotation direction of the steering wheel 2. By executing the control of adjusting the vibration of the steering wheel 2 in the rotation direction (vibration in the steering wheel circumferential direction) through the control of the EPS device 6 commensurate with the state of operation of the vehicle, the EPS control device 8 is able to control the vibration of the steering wheel 2 in the rotation direction to an appropriate magnitude in accordance with the state of operation of the vehicle. The EPS control device 8 controls the EPS device 6 so that the vibration of the steering wheel 2 in the rotation direction does not reduce, depending on the state of operation of the vehicle. More specifically, the EPS control device 8 realizes an assist characteristic and a vibration restraining performance that are suitable to the state of operation of the vehicle by permitting vibration of the steering wheel 2 in the rotation direction according to the state of operation of the vehicle or by actively increasing the vibration of the steering wheel 2 in the rotation direction in some cases.

Then, the steering apparatus 1 of the embodiment determines whether or not so-called kickback has occurred on the basis of the operation point that is determined according to the steering angle detected by the steering angle sensor 12 and the steering torque detected by the torque sensor 13, so that the steering apparatus 1 improves the accuracy of the determination regarding occurrence of the kickback, and therefore properly copes with the kickback. It is to be noted herein that the kickback is a large fluctuation or vibration of the steering wheel that occurs as fluctuation of the state of contact between the road surface and the steering road wheels propagates to the steering wheel 2; typically, the kickback corresponds to an acute strong vibration (impact) in the steering wheel circumferential direction that propagates to the steering wheel 2 due to irregularity of the road surface, steps, stones and other obstacles.

The EPS control device 8 in this embodiment is not only the control device that controls the EPS device 6, but a kickback determination apparatus that determines whether the kickback has occurred. The EPS control device 8 determines that the kickback has occurred, if the operation point determined according to the steering angle of the steering wheel 2 and the steering torque that acts on the steering wheel 2 is outside a predetermined criterion region that is set beforehand.

Therefore, in the steering apparatus 1, the EPS control device 8 is able to accurately determine with high precision a kickback that discomforts the driver, by using values based on the steering torque, the steering angle, etc., that are detected by the sensors and the like. Consequently, when the EPS control device 8 determines that there has occurred a kickback that discomforts the driver, the vibration of the steering wheel 2 in the circumferential direction due to the kickback can be restrained through control of the EPS device 6.

In this embodiment, the EPS control device 8 determines the presence of the kickback also in the case where the speed of change of the steering angle of the steering wheel 2 is smaller than a predetermined speed that is set beforehand and where the amount of change of the steering torque that acts on the steering wheel 2 is larger than a predetermined amount of change that is set beforehand. That is, the EPS control device 8 of this embodiment determines occurrence of the kickback by combining an operation point determination based on the operation point that is determined according to the steering angle and the steering torque and the amount-of-torque change determination based on the speed of change of the steering angle and the amount of change of the steering torque per unit time. Hereinafter, "amount of change of the steering torque" means "amount of change of the steering torque per unit time" and "predetermined amount of change" means "predetermined amount of change per unit time".

Firstly, the amount-of-torque change determination will be described with reference to FIG. 2. In the diagram shown in FIG. 2, the horizontal axis represents time t, and the vertical axis represents the steering torque change amount dT (i.e., the amount of change of the steering torque) per unit time. In the amount-of-torque change determination, the EPS control device 8 calculates a change speed dA of the steering angle A on the basis of the steering angles A that the steering angle sensor 12 detects at arbitrary determination target time points. Besides, on the basis of the steering torques T that the torque sensor 13 detects at the arbitrary determination target time points, the EPS control device 8 calculates a change amount dT of the steering torque T per unit time.

Then, the EPS control device 8 determines whether or not the change speed dA (i.e., speed of change) of the steering angle A is smaller than threshold speed value ThdA as a predetermined speed that is set beforehand, and determines whether or not the change amount dT of the steering torque T per unit time is larger than a change amount threshold value ThdT per unit time as a predetermined amount of change per unit time that is set beforehand. It suffices that the threshold speed value ThdA and the change amount threshold value ThdT per unit time are set beforehand on the basis of the magnitude of the kickback that is desired to be detected, the specifications of the vehicle, the steering characteristic thereof, the actual vehicle evaluation, etc.

The EPS control device 8 determines that the reaction force from the road surface, that is, the kickback force, is large, and that the present state is a kickback state in which a kickback uncomfortable to the driver is occurring, if as shown by dotted lines within an area enclosed by a dotted line in FIG. 2, the change speed dA of the steering angle A is smaller than the threshold speed value ThdA and the change amount dT of the steering torque T per unit time is larger than the change amount threshold value ThdT per unit time.

Next, with reference to FIG. 3, the operation point determination will be described. In the diagram shown in FIG. 3, the horizontal axis represents the steering torque T, and the vertical axis represents the steering angle A. In the operation point determination, on the basis of the steering angle A that the steering angle sensor 12 at an arbitrary determination target time point and the steering torque T that the torque sensor 13 detects at the arbitrary determination target time point, the EPS control device 8 finds an operation point that is determined according to the relationship between the steering angle A and the steering torque T at this determination target time point.

Then, the EPS control device 8 determines whether or not the operation point at the determination target time point is outside a predetermination criterion region X1 that is set beforehand, that is, whether or not the operation point is inside a kickback region X2 or X3 outside the criterion region X1.

The criterion region X1 is, for example, a region that is prescribed beforehand with respect to the operation point commensurate with the steering angle and the steering torque by a function f1 and a function f2 in the T (steering torque)-A (steering angle) graph shown in FIG. 3 (or maps that correspond to the function f1 and the function f2). It suffices that the function f1 and the function f2 are set beforehand on the basis of the magnitude of the kickback that is desired to be detected, the specifications of the vehicle, the steering characteristic thereof, the actual vehicle evaluation, etc. The criterion region X1 is a region sandwiched between the function f1 and the function f2, that is, a region contained between the function f1 and the function f2. On the other hand, the kickback region X2 is a region on the side of the function f1 in which the steering torque T is relatively small, and the kickback region X3 is a region that includes the line of the function f2 and a region on the side of the function f2 in which the steering torque T is relatively large. The criterion region X1 is a region such that if the operation point exists in the region, it is determined that the present state is not the kickback state. On the other hand, the kickback regions X2 and X3 are regions such that if the operation point exists in either one of the regions, it is determined that the present state is the kickback state.

The EPS control device 8 determines that the kickback force is large and that the present state is a kickback state in which a kickback uncomfortable to the driver is occurring, in the case where as shown by a thick-solid line portion in an area enclosed by a line L2, the operation point at the determination target time point is outside the criterion region X1, that is, the operation point at the determination target time point is on the function f1, or on the function f2, or inside the kickback region X2, or inside the kickback region X3.

As a result, the EPS control device 8 is able to properly determine that the present state is the kickback state, in the case, for example, where although it cannot be determined in the amount-of-torque change determination that the present state is the kickback state, there is actually occurring a kickback that is uncomfortable to the driver.

FIGS. 4A, 4B, 5A and 5B, in each of which the horizontal axis represents time t and the vertical axis represents the steering torque change amount dT per unit time or the steering torque T, illustrate changes that occur, for example, in the case where it is assumed that the kickback determination is performed only by the amount-of-torque change determination (comparative example). An EPS control device in accordance with this comparative example, if it is assumed that the device performs the kickback determination only by the amount-of-torque change determination, is able to determine that, for example, a state in which the change amount dT of the steering torque T is larger than a change amount threshold value ThdT, and which is indicated by thick-solid line portions in an area enclosed by a line L3 in FIG. 4B, is a kickback state in which a kickback is occurring, but is not able to determine that the kickback phenomenon as a whole is an uncomfortable kickback state, and therefore is likely to, for example, fail to sufficiently restrain the vibration caused by the kickback. On the other hand, for example, if it is assumed that the change amount threshold value ThdT is set at a relatively small value in order to determine the presence or absence of an uncomfortable kickback state in a broad range in the kickback phenomenon as shown by thick-solid line portions in an area enclosed by a line L4 in FIG. 5B, the EPS control device in accordance with the comparative example is likely to determine vibration other than the kickback phenomenon, for example, a vibration commensurate with the road surface information or the like transmitted from the road surface side to the steering wheel 2 side, as being the kickback state. Therefore, the EPS control device in accordance with the comparative example is likely to restrain vibration other than the kickback phenomenon as well and therefore excessively reduce the vibration commensurate with the road surface information or the like transmitted from the road surface side to the steering wheel 2 side.

In contrast, the EPS control device 8 of the embodiment of the invention determines in the operation point determination that the present state is the kickback state in which a kickback uncomfortable to the driver is occurring, if the operation point determined according to the steering angle A and the steering torque T at the determination target time point is outside the criterion region X1. Therefore, the EPS control device 8 is able to determine the presence of a kickback state that is uncomfortable to the driver in a broad range of the kickback phenomenon while restraining the determination in which even a vibration other than the kickback phenomenon, for example, a vibration commensurate with the road surface information or the like transmitted from the road surface side to the steering wheel 2 side, is determined as being a kickback state. As a result, this steering apparatus 1 is able to improve the determination accuracy in the EPS control device 8 determining whether or not a kickback has occurred, and is able to properly cope with the kickback.

The EPS control device 8, by performing the kickback determination by combining the operation point determination and the amount-of-torque change determination, is able to determine that, for example, the state corresponding to the thick-solid line portions in an area enclosed by a line L7 in FIG. 6, is the kickback state, by the operation point determination, and is also able to determine that the state corresponding to the thick-solid line portions in the area enclosed by the line L7 in FIG. 6 is the kickback state by the amount-of-torque change determination. Consequently, because the EPS control device 8 performs the kickback determination by combining the operation point determination and the amount-of-torque change determination, the steering apparatus 1 is able to accurately determine with high precision the entire kickback phenomenon as being an uncomfortable kickback state.

The EPS control device 8 is able to execute the control of restraining the vibration of the steering wheel 2 in the rotation direction thereof (vibration in the steering wheel circumferential direction) by controlling the EPS device 6 if the EPS control device 8 determines that the operation point at the determination target time point is outside the criterion region X1 and the present state is a kickback state that is uncomfortable to the driver. Besides, the EPS control device 8 is able to execute the control of restraining the vibration of the steering wheel 2 in the rotation direction thereof by controlling the EPS device 6 if determining that the change speed dA of the steering angle A is smaller than the threshold speed value ThdA and the change amount dT of the steering torque T is larger than the change amount threshold value ThdT and therefore that the present state is a kickback state uncomfortable to the driver. The EPS control device 8, if determining that the kickback state is present and that the kickback is large, restrains the vibration by relatively increasing the assist torque provided by the EPS device 6 in such a direction as to cancel out the kickback according to the determination made regarding the present kickback. If the EPS control device 8 determines that the present state is not the kickback state and that the kickback is small, or determines that kickback is not present, the EPS control device 8 relatively lessens the assist torque provided by the EPS device 6 for restraining the vibration of the steering wheel 2 in the rotation direction, and permits the vibration.

As a result, when the kickback from the road surface is large, the steering apparatus 1 is able to restrain the torque of this kickback by adjusting the assist torque that is provided by the EPS device 6. This steering apparatus 1 is able to restrain the uncomfortable vibration of kickback and therefore properly cope with the kickback while permitting vibrations other than the kickback phenomenon, for example, a vibration commensurate with the road surface information or the like transmitted from the road surface side to the steering wheel 2 side. That is, the steering apparatus 1 is able to notify the driver of information regarding the state of operation of the vehicle, such as the state of the road surface, by the vibration of the steering wheel 2 in the rotation direction thereof, and is therefore able to transmit to the driver so-called road information, such as information about the road surface or the like, and is able to properly restrain the vibration of the kickback in accordance with need.

It is to be noted herein that in this embodiment, the criterion region X1 is set in the example in FIG. 3 so that the width of the region X1 in terms of the steering torque T (a width thereof along the horizontal axis) differs according to the size of the steering angle A. Besides, the criterion region X1 is set so that the boundary torque relative to the steering torque T increases as the steering angle A increases. That is, the criterion region X1 is set so that the interval between the function f1 and the function f2 in terms of the steering torque T (i.e., the interval therebetween along the horizontal axis) differs according to the size of the steering angle A, and the function f1 and the function f2 are set so that the steering torque T increases with increases in the steering angle A.

That is, for example, in the case where as shown in FIG. 3, the steering angle A is divided into a first region a, a second region b and a third region c in the ascending order of the steering angle A, the criterion region X1 in this embodiment is such that the width Wb in the second region b in terms of the steering torque T is greater than the widths Wa and Wc of the first region a and the third region c in terms of the steering torque T. Besides, in the criterion region X1, the steering torque T relatively increases in the order of the first region a, the second region b and the third region c. That is, the first region a of the criterion region X1 is a small-angle and small-torque region in which the steering angle A is relatively small and the steering torque T is relatively small. The third region c is a large-angle and large-torque region in which the steering angle A is relatively large and the steering torque T is relatively large. The second region b is an intermediate-angle and intermediate-torque region between the first region a and the third region c.

In this case, for example, in the EPS control device 8, in the small-angle and small-torque region near the first region a and in the large-angle and large-torque region near the third region c, the criterion region X1 in which it is not determined that the present state is the kickback state (i.e., a region in which vibration is permitted) is narrower than in the intermediate-angle and intermediate-torque region near the second region b, and the kickback regions X2 and X3 (i.e., regions in which vibration is restrained) are wider than in the intermediate-angle and intermediate-torque region near the second region b. Therefore, the EPS control device 8 is able to restrain the change amount dT of the steering torque T and the vibration in the steering wheel circumferential direction to greater extents in the small-angle and small-torque region and the large-angle and large-torque region in which excessively large change amounts dT of the steering torque T input from the road surface and excessively large vibrations in the steering wheel circumferential direction input from the road surface are undesirable.

In the EPS control device 8, in the intermediate-angle and intermediate-torque region near the second region b, the criterion region X1 is set relatively wide, and the kickback regions X2 and X3 are set relatively narrow. Therefore, in the intermediate-angle and intermediate-torque region in which vibration is desired to be transmitted to the driver, the EPS control device 8 is able to lessen the restraint of the change amount dT of the steering torque T and the vibration in the steering wheel circumferential direction that are input from the road surface, to certain degrees, as information from the road surface. That is, the EPS control device 8 is able to permit the change amount dT of the steering torque T and the vibration in the steering wheel circumferential direction.

Incidentally, the shape of the criterion region X1 is not limited to the illustration in FIG. 3, but it suffices that the shape is arbitrarily set according to the demanded performances and the like. In other words, the steering apparatus 1, by arbitrarily adjusting the shape of the criterion region X1, is able to appropriately adjust the degree of restraint and permission of the change amount dT of the steering torque T and the vibration in the steering wheel circumferential direction according to need.

Next, an example of the kickback determination control will be described with reference to a flowchart shown in FIG. 7. Incidentally, the control routine shown in FIG. 7 is repeated in a control cycle of several hundred microseconds to several ten milliseconds.

Firstly, the EPS control device 8 acquires the steering torque T that acts on the steering wheel 2 and the steering angle A of the steering wheel 2 on the basis of various detection results provided by the state detection device 7 (ST1).

Next, on the basis of the steering torque T and the steering angle A acquired in ST1, the EPS control device 8 calculates the change amount dT of the steering torque T and the change speed dA of the steering angle A. Then, the EPS control device 8 determines whether or not the change speed dA of the steering angle A is smaller than the threshold speed value ThdA and the change amount dT of the steering torque T is larger than the change amount threshold value ThdT (ST2).

If the change speed dA of the steering angle A is greater than or equal to the threshold speed value ThdA or the change amount dT of the steering torque T is less than or equal to the change amount threshold value ThdT (NO in ST2), the EPS control device 8 then determines whether or not the operation point determined according to the steering torque T and the steering angle A acquired in ST1 is outside the criterion region X1 (e.g., see FIG. 3) (ST3).

If the EPS control device 8 determines in ST2 that the change speed dA of the steering angle A is smaller than the threshold speed value ThdA and that the change amount dT of the steering torque T is larger than the change amount threshold value ThdT (YES in ST2), or determines in ST3 that the operation point is outside the criterion region X1 (YES in ST3), the EPS control device 8 determines that the present state is a kickback state that is uncomfortable to the driver (ST4). Then, the EPS control device 8 executes the control of restraining the vibration of the steering wheel 2 in the rotation direction thereof (vibration in the steering wheel circumferential direction) by controlling the EPS device 6 (ST5), and then ends the present control cycle, and proceeds to the next control cycle.

If determining in ST3 that the operation point is inside the criterion region X1 (NO in ST3), the EPS control device 8 determines that the present state is not a kickback state that is uncomfortable to the driver (ST6). Then, the EPS control device 8 executes the usual assist control (ST7) instead of executing the control of restraining the vibration in the steering wheel circumferential direction. Then, the EPS control device 8 ends the present control cycle, and proceeds to the next control cycle.

According to the embodiment described above, the steering apparatus 1 includes the steering wheel 2 that is provided in a vehicle and that is capable of being turned so as to steer the vehicle, and the EPS control device 8 that determines that the kickback state is present if the operation point determined according to the steering angle of the steering wheel 2 and the steering torque that acts on the steering member is outside the criterion region that is set beforehand. Therefore, the steering apparatus 1 and the EPS control device 8 are able to properly cope with the kickback.

Figure 10:
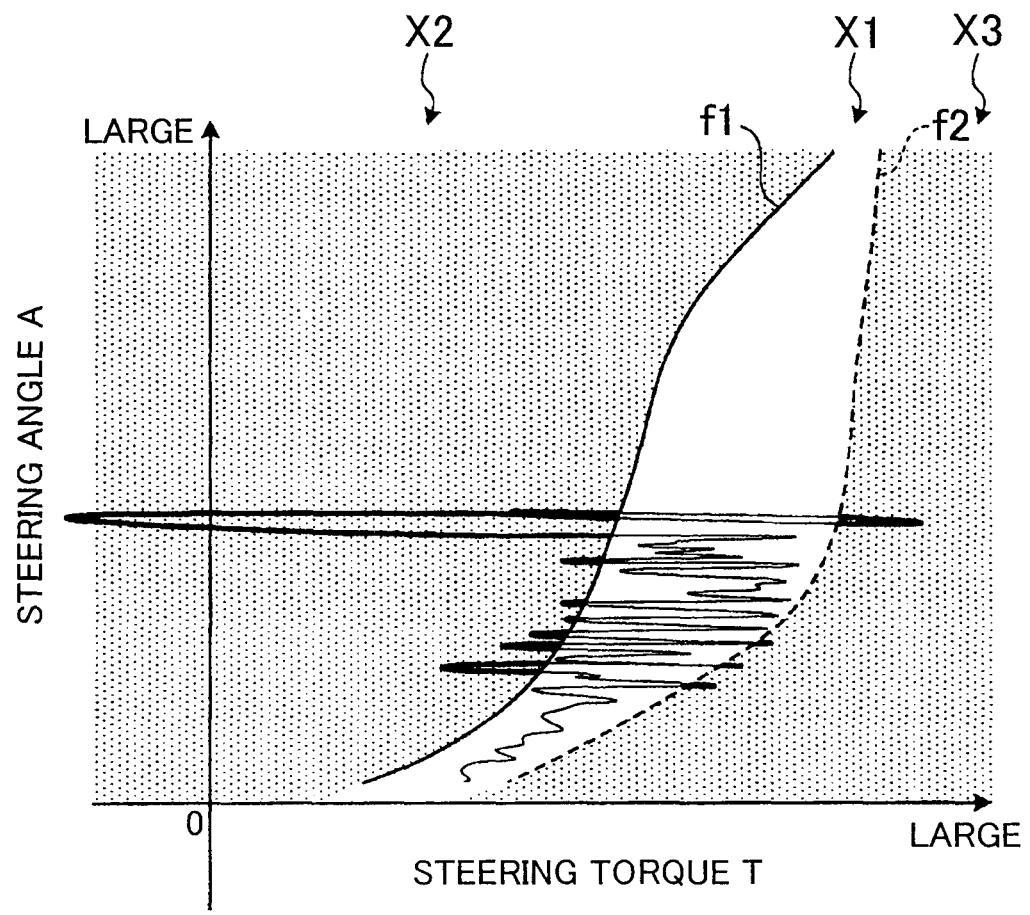
FIG. 10 is a graph illustrating the operation point determination commensurate with the state of the vehicle during a high-vehicle speed state which is performed by the steering apparatus in accordance with the second embodiment.

Next, a second embodiment of the invention will be described. FIG. 8 is a graph illustrating an amount-of-torque change determination that a steering apparatus in accordance with the second embodiment performs according to the state of a vehicle. FIG. 9 and FIG. 10 are graphs illustrating an operation point determination commensurate with the state of the vehicle. A steering apparatus and a kickback determination apparatus in accordance with the second embodiment are different from those of the first embodiment in that the criterion region is changed according to the state of the vehicle. The constructions and the operation and effects of this embodiment that are substantially the same as those of the foregoing embodiment are assigned with the same reference characters, and redundant descriptions thereof will be avoided as much as possible (this will apply to the other embodiments described below). Besides, main constructions of this embodiment are provided as shown in FIG. 1.

In a steering apparatus 201 according to the second embodiment illustrated in FIGS. 8 to 10, an EPS control device 208 changes the criterion region X1 according to the state of the vehicle. In this embodiment, the EPS control device 208 changes the change amount threshold value ThdT for use in the amount-of-torque change determination and the criterion region X1 for use in the operation point determination according to the state of the vehicle. It is to be noted herein that the state of the vehicle includes the state of travel of the vehicle, the state of the steering of the vehicle, the state of operation tendency that the driver demands of the vehicle, etc. The EPS control device 208 in the second embodiment changes the change amount threshold value ThdT of the criterion region X1 according to the state of travel of the vehicle and/or the state of steering of the vehicle.

The EPS control device 208 changes the change amount threshold value ThdT according to the state of steering of the vehicle, such as the steering torque T, the steering angle A, the change speed dA of the steering angle A, etc., or the state of travel of the vehicle, such as the vehicle speed, the vehicle acceleration, etc. That is, the EPS control device 208 sets the change amount threshold value ThdT as a function of the steering angle A, the change speed dA of the steering angle A, the vehicle speed, the vehicle acceleration, etc. (or a map corresponding to the function).

In the illustration in FIG. 8, the EPS control device 208 sets the change amount threshold value ThdT as a function regarding the steering angle A, and changes the change amount threshold value ThdT according to the steering angle A. For example, the EPS control device 208 makes the change amount threshold value ThdT smaller when the steering angle A is relatively large than when the steering angle A is relatively small. In this example, the EPS control device 208 makes the change amount threshold value ThdT smaller the larger the steering angle A, and makes the change amount threshold value ThdT larger the smaller the steering angle A.

Generally, the kickback tends to be larger after the steering of a predetermined steering angle A than during an early period following the start of steering. In the steering apparatus 201, the EPS control device 208 sets the change amount threshold value ThdT smaller when the steering angle A is relatively large than when the steering angle A is relatively small. Therefore, a region in which it is determined that the kickback state is present can be enlarged as shown by thick-dotted line portions in an area enclosed by a line L8 in FIG. 8. As a result, the steering apparatus 201, while permitting vibration commensurate with the road surface information or the like transmitted from the road surface side to the steering wheel 2 side during an early period following the start of steering in a series of steering operations, is able to restrain the uncomfortable vibration of the kickback during a steering maintained state following the steering up to the predetermined steering angle A during which there is a tendency for easy occurrence of the kickback. Thus, the steering apparatus 201 is able to properly cope with the kickback.

Besides, the EPS control device 208 changes the criterion region X1, that is, the functions f1 and f2 according to the state of steering of the vehicle, such as the steering torque change amount dT, the change speed dA of the steering angle A, etc., or the state of travel of the vehicle, such as the vehicle speed, the vehicle acceleration, etc. Specifically, the EPS control device 208 sets the functions f1 and f2 as functions of the state of steering of the vehicle, such as the steering torque change amount dT, the change speed dA of the steering angle A, etc., or the state of travel of the vehicle, such as the vehicle speed, the vehicle acceleration, etc. (or maps that correspond to the functions).

In the illustrative examples in FIGS. 9 and 10, the EPS control device 208 sets the functions f1 and f2, that is, the criterion region X1, as functions related to the vehicle speed, and changes the criterion region X1 according to the vehicle speed. It is to be noted that FIG. 9 exemplifies a low vehicle speed state in which the vehicle speed is relatively low, and FIG. 10 exemplifies a high vehicle speed state in which the vehicle speed is relatively high. The EPS control device 208, for example, makes the interval between the function f1 and the function f2 in terms of the steering torque T (the interval along the horizontal axis) smaller and makes the criterion region X1 narrower when the vehicle speed is relatively high than when the vehicle speed is relatively low. The EPS control device 208 makes the criterion region X1 narrower the higher the vehicle speed, and makes the criterion region X1 wider the lower the vehicle speed.

Generally, the kickback tends to be greater the higher the vehicle speed, and the tendency of the driver feeling insecure and discomforted is stronger the higher the vehicle speed and therefore the greater the kickback. However, in the steering apparatus 201, the EPS control device 208 sets the criterion region X1 narrower when the vehicle speed is relatively high than when the vehicle speed is relatively low, and therefore the region in which the present state is determined as being the kickback state can be broadened. As a result, the steering apparatus 201, while permitting vibration commensurate with the road surface information or the like transmitted from the road surface side to the steering wheel 2 side during a low vehicle speed state, is able to restrain the uncomfortable vibration of the kickback during a high vehicle speed state in which there is a tendency for easy occurrence of the kickback. Thus, the steering apparatus 201 is able to properly cope with the kickback.

Therefore, the steering apparatus 201 and the EPS control device 208 constructed as described above are able to more properly cope with the kickback according to the state of the vehicle in which the steering apparatus 201 is mounted. In this case, it suffices that the EPS control device 208, for example, changes the change amount threshold value ThdT according to the state of the vehicle prior to the determination in ST2 in the flowchart shown in FIG. 7, and changes the criterion region X1 prior to the determination in ST3.

Figure 11:
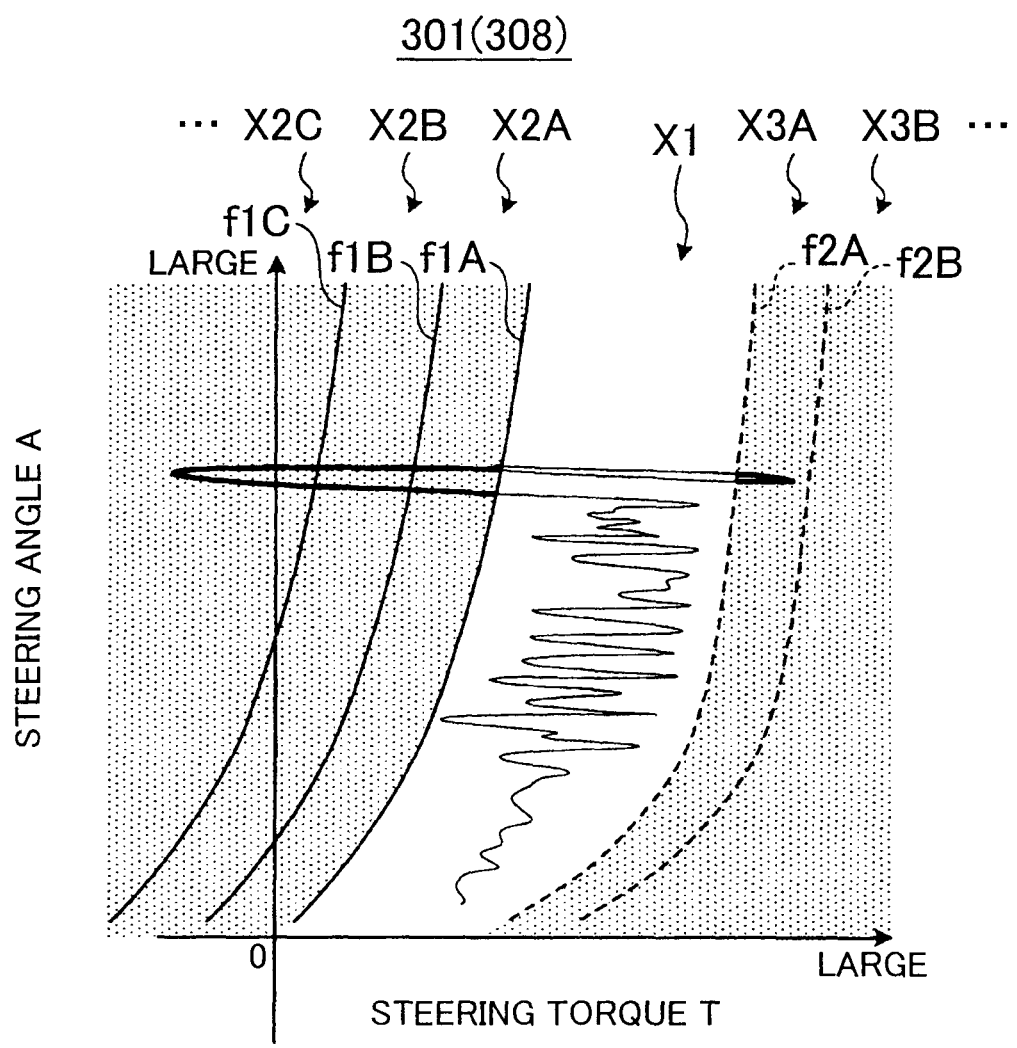
FIG. 11 is a graph illustrating the operation point determination performed by a steering apparatus in accordance with a third embodiment of the invention.

Next, a third embodiment of the invention will be described. FIG. 11 is a graph illustrating an operation point determination performed in a steering apparatus in accordance with the third embodiment. The steering apparatus and a kickback determination apparatus in accordance with the third embodiment are different from those of the first and second embodiments in that the criterion region is divided into a plurality of stages.

In a steering apparatus 301 of the third embodiment illustrated in FIG. 11, the region outside the criterion region X1 for use in the operation point determination is divided into a plurality of stages. The region outside the criterion region Xl is set so that the region is divided into a plurality of stages according to the magnitude of the kickback to the steering wheel 2, that is, the magnitude of the vibration. Specifically, the region outside the criterion region X1 is divided into a plurality of kickback regions X2A, X2B, X2C, . . . , and kickback regions X3A, X3B, . . . In this example, a plurality of functions f1B, f1C, . . . are set according to the magnitude of the kickback to the steering wheel 2, at predetermined intervals with reference to the function f1A that defines the low steering torque side of the criterion region X1, in the region on the lower steering torque side of the function f1A. The functions f1A, f1B, f1C, . . . define the regions X2A, X2B, X2C, . . . in the region on the lower steering torque side of the function f1A. The kickback regions X2A, X2B, X2C, . . . are regions in which the magnitude of the kickback to the steering wheel 2 increases stepwise in that order. Likewise, a plurality of functions f2B, f2C, . . . are set according to the magnitude of the kickback to the steering wheel 2, at predetermined intervals with reference to the function f2A that defines the high steering torque side of the criterion region X1, in the region on the higher steering torque side of the function f2A. The functions f2A, f2B, . . . define the regions X3A, X3B, . . . in the region on the higher steering torque side of the function f2A. The kickback regions X3A, X3B, . . . are regions in which the magnitude of the kickback to the steering wheel 2 increases stepwise in that order.

Incidentally, although not shown in the drawings, the change amount threshold value ThdT for use in the amount-of-torque change determination is also set stepwise at a plurality of values. That is, similarly to the criterion region X1 described above, the change amount threshold value ThdT is set at a plurality of values according to the magnitude of the kickback to the steering wheel 2, that is, the magnitude of vibration.

Therefore, the steering apparatus 301 and the EPS control device 308 constructed as described above are able to determine the presence/absence of the kickback to the steering wheel 2 discretely according to the magnitude of the kickback (e.g., ranking the magnitude thereof into a plurality of levels). Then, for example, if the presently occurring kickback is relatively large, the EPS control device 308 restrains the vibration by correspondingly relatively increasing the assist torque from the EPS device 6 in such a direction as to cancel out the kickback. If the kickback is relatively small, the EPS control device 308 permits the vibration by correspondingly relatively lessening the assist torque for restraining the vibration of the steering wheel 2. As a result, the steering apparatus 301 and the EPS control device 308, if determining that the present state is the kickback state, are able to optimize the amount of implementation of the vibration restraining control (the amount of restraint, the assist amount), or the like, according to the magnitude of the kickback that is presently occurring, and are therefore able to cope with the kickback more properly.

Next, a fourth embodiment of the invention will be described. FIG. 12 is a schematic perspective view illustrating a general construction of a steering apparatus in accordance with the fourth embodiment. FIG. 13 shows an example of a control map. A steering apparatus and a kickback determination apparatus in accordance with the fourth embodiment are different from those of the first to third embodiments in that the criterion region is changed according to the set mode of an actuator.

In a steering apparatus 401 of the embodiment illustrated in FIGS. 12 and 13, an EPS control device 408 changes the criterion region X1 according to the state of a vehicle in which the steering apparatus 401 is mounted. In this embodiment, the EPS control device 408 changes the change amount threshold value ThdT for use in the amount-of-torque change determination and the criterion region X1 for Use in the operation point determination according to the state of the vehicle. The EPS control device 408 in this embodiment changes the change amount threshold value ThdT or the criterion region X1 according to, for example, the state of operation tendency that the driver demands of the vehicle. For example, the EPS control device 408 sorts the state of operation tendency that the driver desires with regard to the vehicle on the basis of the detection signals from various sensors, the state of operation of a device other than the EPS control device 408, and the like. Then, on the basis of the resultant sort of the operation tendency, the EPS control device 408 changes the change amount threshold value ThdT or the criterion region X1. In other words, the EPS control device 408 changes the change amount threshold value ThdT or the criterion region X1 on the basis of, for example, the state of operation of a device other than the EPS control device 408, and the like.

In this embodiment, the EPS control device 408 changes the change amount threshold value ThdT or the criterion region X1 according to the set mode of an actuator 415 that is mounted in the vehicle. The actuator 415 is, for example, a device capable of the motion control of the vehicle, the posture control thereof, etc. In this embodiment, the actuator 415 includes, for example, a damping force control suspension system (e.g., an adaptive variable suspension system (AVS), abbreviated as "control suspension" hereinafter unless otherwise stated) 416 that is capable of changing the suspension characteristic of the vehicle. The EPS control device 408 changes the change amount threshold value ThdT or the criterion region X1 according to the set mode of the control suspension 416.

It is to be noted herein that the control suspension 416 makes variable the damping characteristic of a shock absorber of the suspension that buffers the input to the road wheels of the vehicle from the road surface, and therefore is able to change the ride quality of the vehicle and the vehicle's traveling performance. In this embodiment, the control suspension 416 is capable of selectively setting an arbitrary one of a plurality of modes, for example, a sports mode, a normal mode, a comfort mode, etc., as exemplified in FIG. 13, according to the driver's tendency in driving. Then, according to the set mode selected from the plurality of modes, the damping characteristic of the shock absorber is changed.

Then, the EPS control device 408 in the fourth embodiment changes the change amount threshold value ThdT or the criterion region X1 according to the set mode of the control suspension 416 as the state of the vehicle, that is, according to the driver's tendency in driving that corresponds to the set mode of the control suspension 416. In the case where the normal mode has been selected as the set mode of the control suspension 416, the EPS control device 408 sets the change amount threshold value ThdT to a normal (or usual) reference value, and sets the criterion region X1 to a normal (or usual) reference region, as exemplified in FIG. 13. In the case where the sports mode has been selected as the set mode of the control suspension 416, that is, in the case where the driver's tendency in driving is relatively high in the tendency toward sports driving, the EPS control device 408 sets the change amount threshold value ThdT higher than the reference value, and expands the criterion region X1 from the reference region. In the case where the comfort mode has been selected as the set mode of the control suspension 416, that is, in the case where the driver's tendency in driving is relatively low in the tendency toward sports driving, and is high in the tendency to place importance on the ride quality, the EPS control device 408 sets the change amount threshold value ThdT lower than the reference value, and reduces the criterion region X1 from the reference region.

As a result, the steering apparatus 401, while permitting the vibration commensurate with the road surface information and the like transmitted from the road surface side to the steering wheel 2 side during the sports mode during which the tendency toward sports driving is relatively high, is able to restrain the uncomfortable vibration of the kickback during the comfort mode during which the tendency toward sports driving is relatively low. Thus, the steering apparatus 401 is able to properly cope with the kickback.

Therefore, the steering apparatus 401 and the EPS control device 408 constructed as described above are able to properly cope with the kickback according to the state of the vehicle in which the steering apparatus 401 is mounted, that is, according to the set mode of the control suspension 416 (the actuator 415) in this embodiment.

Incidentally, the steering apparatuses and the kickback determination apparatuses in accordance with the foregoing embodiments of the invention are not limited to the above-described constructions, but can be modified in various manners. A steering apparatus and a kickback determination apparatus according to an embodiment of the invention may be constructed by combining two or more of the foregoing embodiments.

Although in the foregoing steering apparatuses, the kickback determination apparatus and the control device are both realized by the EPS control device 8, this construction is not restrictive. That is, a kickback determination apparatus and a control device may be separately provided.

Although the determination device described above determines whether or not the kickback has occurred by combining the operation point determination based on the operation point that is determined according to the steering angle and the steering torque, and the amount-of-torque change determination based on the change speed of the steering angle and the change amount of the steering torque per unit time, this is not restrictive. For example, the determination device may determine whether or not the kickback has occurred by using only the operation point determination without using the amount-of-torque change determination.

Although in the foregoing description, the control device executes the control of restraining vibration by controlling the adjustment device in the case where it is determined that the operation point determined according to the steering angle of the steering member and the steering torque that acts on the steering member is outside the criterion region determined beforehand, and that the present state is the kickback state, this is not restrictive. The control device may be designed so as to execute a control of restraining the vibration by directly controlling the adjustment device according to whether or not the operation point is outside the criterion region, without determining the presence or absence of occurrence of the kickback. That is, the control device may be constructed so as to be able to execute the control of restraining the vibration by controlling the adjustment device in the case where the operation point determined according to the steering angle of the steering member and the steering torque that acts on the steering member is outside the criterion region set beforehand. In this case, too, the steering apparatus is able to properly cope with the kickback.

Although in the foregoing description, it is assumed that the adjustment device is the EPS device, and adjusts the vibration in the rotation direction of the steering member by adjusting the degree of transmission of the vibration transmitted to the steering member, this is not restrictive. That is, the adjustment device may be provided separately from the EPS device.

Although in the foregoing description, the control device adjusts the degree of transmission of the vibration transmitted to the steering member, and adjusts the vibration of the steering member in the rotation direction thereof, this is not restrictive. For example, the vibration transmitted to the steering member may be adjusted by directly adjusting the output of the electric motor 10.

Although in the foregoing description, the steering apparatus is provided with the column assist-type column EPS device, this is not restrictive. For example, the steering apparatus is applicable to, for example, both the pinion assist type and the rack assist type, and is also applicable not only to the system that includes the electric power steering apparatus but also to a system that includes a hydraulic power steering apparatus.

Although in the foregoing description, the actuator includes the control suspension 416, this is not restrictive. For example, the actuator may include a transmission of a vehicle, an ABS (antilock brake system) device, a BA (brake assist) device, a VSC (vehicle stability control (skid prevention)) device, a TRC (traction control system) apparatus, a VDIM (vehicle dynamics integrated management, or active steering integrated control) device, a variable stabilizer device, etc. The determination device may change the criterion region according to the state of operation and the set mode.

Thus, the steering apparatus and the kickback determination apparatus according to the invention, as described above, are suitably applied to the steering apparatus and the kickback determination apparatus that can be mounted in various vehicles.

The invention claimed is:

1. A steering apparatus comprising:
a steering member that is provided in a vehicle and that is capable of being turned so as to perform steering;
a determination device that determines that a kickback state is present, if an operation point determined based on steering angle of the steering member and steering torque that acts on the steering member is outside a criterion region that is set beforehand, wherein
a width of the criterion region in terms of the steering torque differs according to magnitude of the steering angle, and when a first region, a second region, and a third region are set in order from a side where the steering angle is small toward a side where the steering angle is large, the steering torque increases in order of the first region, the second region, and the third region, and a width of the second region in terms of the steering torque is wider than widths of the first region and the third region in terms of the steering torque,
the first region is a small-angle and small-torque region in which the steering angle is smaller than a first predetermined value and the steering torque is smaller than a second predetermined value, and is a region in which a change amount of the steering torque and vibration of the steering member in a circumferential direction due to an input from a road surface being excessively large is undesirable,
the third region is a large-angle and large-torque region in which the steering angle is larger than a third predetermined value and the steering torque is larger than a fourth predetermined value, and is a region in which the change amount of the steering torque and the vibration of the steering member in the circumferential direction due to the input from the road surface being excessively large is undesirable, and
the second region is an intermediate-angle and intermediate-torque region between the first region and the third region, and is a region in which the change amount of the steering torque and the vibration of the steering member in the circumferential direction due to the input from the road surface are desired to be transmitted to a driver as information from the road surface.

2. The steering apparatus according to claim 1, wherein the determination device changes the criterion region according to a state of the vehicle.

3. The steering apparatus according to claim 1, wherein the determination device changes the criterion region according to a vehicle speed of the vehicle.

4. The steering apparatus according to claim 3, wherein the determination device makes the criterion region narrower when the vehicle speed increases.

5. The steering apparatus according to claim 1, wherein the determination device changes the criterion region according to a set mode of an actuator that is mounted in the vehicle.

6. The steering apparatus according to claim 5, wherein the actuator is capable of changing a suspension characteristic of the vehicle.

7. The steering apparatus according to claim 1, wherein a region outside the criterion region is divided into a plurality of stages according to magnitude of a kickback to the steering member.

8. The steering apparatus according to claim 1, wherein the determination device determines that the kickback state is present, if a change speed of the steering angle is smaller than a predetermined speed that is set beforehand and the change amount of the steering torque is larger than a predetermined change amount that is set beforehand.

9. The steering apparatus according to claim 1, further comprising:
an adjustment device capable of adjusting vibration of the steering member in a rotation direction; and
a control device capable of executing a control of restraining the vibration by controlling the adjustment device, if the determination device determines that the kickback state is present.

10. A steering apparatus comprising:
a steering member that is provided in a vehicle and that is capable of being turned so as to perform steering;
an adjustment device capable of adjusting vibration of the steering member in a rotation direction; and
a control device capable of executing a control of restraining the vibration by controlling the adjustment device, if an operation point determined based on steering angle of the steering member and steering torque that acts on the steering member is outside a criterion region that is set beforehand, wherein
a width of the criterion region in terms of the steering torque differs according to magnitude of the steering angle, and when a first region, a second region, and a third region are set in order from a side where the steering angle is small toward a side where the steering angle is large, the steering torque increases in order of the first region, the second region, and the third region, and a width of the second region in terms of the steering torque is wider than widths of the first region and the third region in terms of the steering torque,
the first region is a small-angle and small torque region in which the steering angle is smaller than a first predetermined value and the steering torque is smaller than a second predetermined value, and is a region in a change amount of the steering torque and vibration of the steering member in a circumferential direction due to an input from a road surface being excessively large is undesirable,
the third region is a large-angle and large-torque region in which the steering angle is larger than a third predetermined value and the steering torque is larger than a fourth predetermined value, and is a region in which the change amount of the steering torque and the vibration of the steering member in the circumferential direction due to the input from the road surface being excessively large is undesirable, and
the second region is an intermediate-angle and intermediate-torque region between the first region and the third region, and is a region in which the change amount of the steering torque and the vibration of the steering member in the circumferential direction due to the input from the road surface are desired to be transmitted to a driver as information from the road surface.

11. A kickback determination apparatus, wherein
the kickback determination apparatus determines that a kickback state is present, if an operation point determined according to steering angle of a steering member that is provided in a vehicle and that is capable of being turned so as to perform steering and steering torque that acts on the steering member is outside a criterion region that is set beforehand;
a width of the criterion region in terms of the steering torque differs according to magnitude of the steering angle, and when a first region, a second region, and a third region are set in order from a side where the steering angle is small toward a side where the steering angle is large, the steering torque increases in order of the first region, the second region, and the third region, and a width of the second region in terms of the steering torque is wider than widths of the first region and the third region in terms of the steering torque;
the first region is a small-angle and small torque region in which the steering angle is smaller than a first predetermined value and the steering torque is smaller than a second predetermined value, and is a region in which a change amount of the steering torque and vibration of the steering member in a circumferential direction due to an input from a road surface being excessively large is undesirable;
the third region is a large-angle and large-torque region in which the steering angle is larger than a third predetermined value and the steering torque is larger than a fourth predetermined value, and is a region in which the change amount of the steering torque and the vibration of the steering member in the circumferential direction due to the input from the road surface being excessively large is undesirable; and
the second region is an intermediate-angle and intermediate-torque region between the first region and the third region, and is a region in which the change amount of the steering torque and the vibration of the steering member in the circumferential direction due to the input from the road surface are desired to be transmitted to a driver as information from the road surface.

12. The steering apparatus according to claim 10, wherein
the control device executes the control of restraining the vibration by controlling the adjustment device, if a change speed of the steering angle is smaller than a predetermined speed that is set beforehand and the change amount of the steering torque is larger than a predetermined change amount that is set beforehand.

13. The kickback determination apparatus according to claim 11, wherein
the kickback determination apparatus determines that the kickback state is present, if a change speed of the steering angle is smaller than a predetermined speed that is set beforehand and the change amount of the steering torque is larger than a predetermined change amount that is set beforehand.

* * * * *